United States Patent
Hugl et al.

(10) Patent No.: US 10,778,293 B2
(45) Date of Patent: Sep. 15, 2020

(54) METHODS AND APPARATUSES FOR DYNAMIC TRANSMIT DIVERSITY FALLBACK

(71) Applicant: NOKIA TECHNOLOGIES OY, Espoo (FI)

(72) Inventors: Klaus Hugl, Vienna (AT); Timo Lunttila, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/276,058

(22) Filed: Feb. 14, 2019

(65) Prior Publication Data
US 2019/0260428 A1    Aug. 22, 2019

Related U.S. Application Data

(60) Provisional application No. 62/710,293, filed on Feb. 16, 2018.

(51) Int. Cl.
| | |
|---|---|
| *H04B 7/0417* | (2017.01) |
| *H04B 7/0456* | (2017.01) |
| *H04B 7/0452* | (2017.01) |
| *H04L 5/00* | (2006.01) |

(52) U.S. Cl.
CPC ......... *H04B 7/0417* (2013.01); *H04B 7/0452* (2013.01); *H04B 7/0456* (2013.01); *H04L 5/0023* (2013.01)

(58) Field of Classification Search
CPC .. H04B 7/0417; H04B 7/0452; H04B 7/0456; H04L 5/0023
See application file for complete search history.

(56) References Cited

U.S. PATENT DOCUMENTS

| | | | |
|---|---|---|---|
| 9,071,310 B2 * | 6/2015 | Luo | H04B 7/0689 |
| 2010/0323709 A1 | 12/2010 | Nam et al. | |
| 2013/0021991 A1 * | 1/2013 | Ko | H04L 5/0051 |
| | | | 370/329 |
| 2015/0003316 A1 | 1/2015 | Kim et al. | |
| 2017/0318565 A1 * | 11/2017 | Golitschek Edler von Elbwart | H04W 72/042 |
| 2019/0089445 A1 * | 3/2019 | He | H04W 76/28 |
| 2019/0274122 A1 * | 9/2019 | Golitschek Edler von Elbwart | H04W 72/1289 |

(Continued)

OTHER PUBLICATIONS

Rohde & Schwarz "LTE Transmission Modes and Beamforming White Paper", Jul. 2015, pp. 1-25.*

(Continued)

*Primary Examiner* — Sophia Vlahos
(74) *Attorney, Agent, or Firm* — Squire Patton Boggs (US) LLP

(57) ABSTRACT

Systems, methods, apparatuses, and computer program products for dynamic transmit diversity fallback are provided. One method may include configuring a user equipment with a maximum number of multiple-input multiple-output (MIMO) layers used for transmission mode 9 or transmission mode 10 scheduling, and performing, by a network node, at least one of transmission mode 9 or transmission mode 10 scheduling. The configuring may include indicating to the user equipment to use a modified mapping table providing transmit diversity fallback for the at least one of transmission mode 9 or transmission mode 10 scheduling.

16 Claims, 3 Drawing Sheets

(56) References Cited

U.S. PATENT DOCUMENTS

2019/0305914 A1* 10/2019 Lee ..................... H04W 24/08

OTHER PUBLICATIONS

3GPP TS 36.213 V15.0.0 (Dec. 2017), Technical Specification, 3rd Generation Partnership Project; Technical Specification Group Radio Access Network; Evolved Universal Terrestrial Radio Access (E-UTRA); Physical layer Procedures (Release 15), Dec. 2017.
3GPP TS 36.212 V15.0.1 (Jan. 2018), Technical Specification, 3rd Generation Partnership Project; Technical Specification Group Radio Access Network; Evolved Universal Terrestrial Radio Access (E-UTRA); Multiplexing and channel coding (Release 15), Jan. 2018.
Nokia et al., "Changes on PDSCH procedures in 36.213," 3GPP Draft; R1-1801859, 3GPP TSG RAN WG1 Meeting #92, Athens, Greece, Feb. 26-Mar. 2, 2018.
Nokia et al., Enabling transmit diversity fallback for DL TM 6, 8, 9 and 10 for shorter TTI (36.212, 36.213), 3GPP Draft; R1-1801854, 3GPP TSG RAN WG1 Meeting #92, Athens, Greece, Feb. 26-Mar. 2, 2018.
May 2, 2019 International Search Report issued in International Application No. PCT/EP2019/053802.
Dahlman, Erik et al., "4G LTE/LTE-Advanced for Mobile Broadband—Chapter 10", In: "4G LTE/LTE-Advanced for Mobile Broadband—Chapter 10", Mar. 29, 2011, pp. 145-202.

* cited by examiner

METHODS AND APPARATUSES FOR DYNAMIC TRANSMIT DIVERSITY FALLBACK

CROSS-REFERENCE TO RELATED APPLICATIONS

This application claims priority from U.S. provisional patent application No. 62/710,293 filed on Feb. 16, 2018. The contents of this earlier filed application are hereby incorporated by reference in their entirety.

FIELD

Some example embodiments may generally relate to mobile or wireless telecommunication systems. For instance, various example embodiments may relate to dynamic transmit diversity in such telecommunication systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment is directed to a method that may include configuring a user equipment with a maximum number of multiple-input multiple-output (MIMO) layers used for transmission mode 9 or transmission mode 10 scheduling, and performing, by a network node, at least one of transmission mode 9 or transmission mode 10 scheduling. The configuring may include indicating to the user equipment to use a modified mapping table providing transmit diversity fallback for the at least one of transmission mode 9 or transmission mode 10 scheduling.

Another embodiment is directed to an apparatus that may include at least one processor and at least one memory comprising computer program code. The at least one memory and computer program code may be configured, with the at least one processor, to cause the apparatus at least to configure a user equipment with a maximum number of multiple-input multiple-output (MIMO) layers used for transmission mode 9 or transmission mode 10 scheduling, and perform at least one of transmission mode 9 or transmission mode 10 scheduling. The configuring may include indicating to the user equipment to use a modified mapping table providing transmit diversity fallback for the at least one of transmission mode 9 or transmission mode 10 scheduling.

Another embodiment is directed to an apparatus that may include configuring means for configuring a user equipment with a maximum number of multiple-input multiple-output (MIMO) layers used for transmission mode 9 or transmission mode 10 scheduling, and performing means for performing at least one of transmission mode 9 or transmission mode 10 scheduling. The configuring means may include means for indicating to the user equipment to use a modified mapping table providing transmit diversity fallback for the at least one of transmission mode 9 or transmission mode 10 scheduling.

Another embodiment is directed to a method that may include receiving, from a network node, a configuration of a maximum number of multiple-input multiple-output (MIMO) layers used for transmission mode 9 or transmission mode 10 scheduling, and using, based on the received configuration, a modified mapping table providing transmit diversity fallback for at least one of transmission mode 9 or transmission mode 10 downlink shared channel reception.

Another embodiment is directed to an apparatus that may include at least one processor and at least one memory comprising computer program code. The at least one memory and computer program code may be configured, with the at least one processor, to cause the apparatus at least to receive, from a network node, a configuration of a maximum number of multiple-input multiple-output (MIMO) layers used for transmission mode 9 or transmission mode 10 scheduling, and use, based on the received configuration, a modified mapping table providing transmit diversity fallback for at least one of transmission mode 9 or transmission mode 10 downlink shared channel reception.

Another embodiment is directed to an apparatus that may include receiving means for receiving, from a network node, a configuration of a maximum number of multiple-input multiple-output (MIMO) layers used for transmission mode 9 or transmission mode 10 scheduling, and using means for using, based on the received configuration, a modified mapping table providing transmit diversity fallback for at least one of transmission mode 9 or transmission mode 10 downlink shared channel reception.

BRIEF DESCRIPTION OF THE DRAWINGS

For proper understanding of the invention, reference should be made to the accompanying drawings, wherein.

DETAILED DESCRIPTION

Figure 1A:
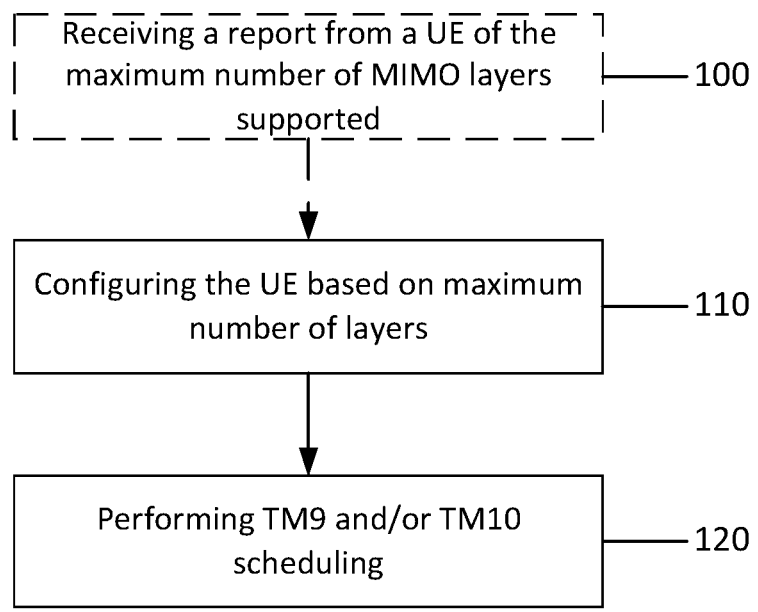
FIG. 1a illustrates an example flow diagram of a method, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for dynamic transmit diversity fallback, as represented in the attached figures and described below, is not intended to limit the scope of certain embodiments but is representative of selected example embodiments.

The features, structures, or characteristics of example embodiments described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

For shorter transmission time interval (TTI) physical downlink shared channel (PDSCH) operation, there is currently no transmit diversity fallback scheduling possible for PDSCH with transmission mode (TM) 9 and/or TM 10, as is the case for LTE 1 ms TTI. As will be discussed in detail below, certain embodiments provide methods to enable dynamic fallback to transmit diversity with shorter TTI PDSCH TM9 and TM10.

For 1 ms TTI LTE operation, a UE configured with TM9 or TM10 will, in addition to the downlink control information (DCI) format scheduling TM9 (DCI Format 2C) and TM10 (DCI Format 2D), also monitor for DCI Format 1A, which enables dynamic fallback to diversity transmission. This may be beneficial, for example, in cases where there is no accurate channel state information (CSI) available or concerning high reliability transmissions requiring diversity.

In contrast, for shorter TTI PDSCH there is no transmission diversity fallback available through DCI, as the UE for shorter TTI PDSCH scheduling would only monitor for a single DL DCI format scheduling shorter TTI PDSCH. This can be seen from Table 1 shown below (which corresponds to Table 7.1-5C in 3GPP TS 36.213 V15.0.0).

TABLE 1

| Transmission mode | DCI format | Search Space | Transmission scheme of PDSCH corresponding to SPDCCH |
|---|---|---|---|
| Mode 1 | DCI format 7-1A | UE specific by C-RNTI | Single-antenna port, port 0 (see Subclause 7.1.1) |
| Mode 2 | DCI format 7-1A | UE specific by C-RNTI | Transmit diversity (see Subclause 7.1.2) |
| Mode 3 | DCI format 7-1B | UE specific by C-RNTI | Large delay CDD (see Subclause 7.1.3) |
| Mode 4 | DCI format 7-1C | UE specific by C-RNTI | Closed-loop spatial multiplexing (see Subclause 7.1.4) |
| Mode 6 | DCI format 7-1D | UE specific by C-RNTI | Closed-loop spatial multiplexing (see Subclause 7.1.4) using a single transmission layer |
| Mode 8 | DCI format 7-1E | UE specific by C-RNTI | Dual layer transmission, port 7 and 8 (see Subclause 7.1.5A) or single-antenna port, port 7 or 8 (see Subclause 7.1.1) |
| Mode 9 | DCI format 7-1F | UE specific by C-RNTI | Dual layer transmission port 7-8 (see Subclause 7.1.5A), if UE is configured with higher layer parameter semiOpenLoop, up to 4 layer transmission, ports 7-10 (see Subclause 7.1.5B) otherwise; or single-antenna port, port 7, 8, 11, or 13 (see Subclause 7.1.1) if UE is configured with higher layer parameter dmrs-tableAlt, single-antenna port, port 7 or 8 (see Subclause 7.1.1) otherwise |
| Mode 10 | DCI format 7-1G | UE specific by C-RNTI | Dual layer transmission port 7-8 (see Subclause 7.1.5A), if UE is configured with higher layer parameter semiOpenLoop, up to 4 layer transmission, ports 7-10 (see Subclause 7.1.5B) otherwise; or single-antenna port, port 7, 8, 11, or 13 (see Subclause 7.1.1) if UE is configured with higher layer parameter dmrs-tableAlt, single-antenna port, port 7 or 8 (see Subclause 7.1.1) otherwise |

Certain example embodiments provide a solution for how to enable transmit diversity fallback for TM9 and TM10, without any needed additional bits. Dynamic transmit diversity fallback within the DCI can be done if there are unused signalling states or bits available in the precoding signaling. In this case, transmit diversity fallback may be achieved by utilizing the unused states, for example as done for shorter TTI DL TM4 with the precoding indication as shown in Table 2 (corresponding to Table 5.3.3.1.19-1 of 3GPP TS 36.212 V15.0.1) and Table 3 (corresponding to Table 5.3.3.1.19-2 of 3GPP TS 36.212 V15.0.1) below.

TABLE 2

| Bit field mapped to index | Message |
|---|---|
| 0 | 2 layers: Transmit diversity |
| 1 | 1 layer: Precoding corresponding to precoding vector $[1\ 1]^T / \sqrt{2}$ |

TABLE 2-continued

| Bit field mapped to index | Message |
|---|---|
| 2 | 1 layer: Precoding corresponding to precoder vector $[1\ -1]^T/\sqrt{2}$ |
| 3 | 1 layer: Precoding corresponding to precoder vector $[1\ j]^T/\sqrt{2}$ |
| 4 | 1 layer: Precoding corresponding to precoder vector $[1\ -j]^T/\sqrt{2}$ |
| 5 | 1 layer: Precoding according to the latest PMI report on PUSCH, using the precoder(s) indicated by the reported PMI(s), if RI = 2 was reported, using $1^{st}$ column multiplied by $\sqrt{2}$ of all precoders implied by the reported PMI(s) |
| 6 | 1 layer: Precoding according to the latest PMI report on PUSCH, using the precoder(s) indicated by the reported PMI(s), if RI = 2 was reported, using $2^{nd}$ column multiplied by $\sqrt{2}$ of all precoders implied by the reported PMI(s) |
| 7 | 2 layers: Precoding corresponding to precoder matrix $\frac{1}{2}\begin{bmatrix}1 & 1\\1 & -1\end{bmatrix}$ |
| 8 | 2 layers: Precoding corresponding to precoder matrix $\frac{1}{2}\begin{bmatrix}1 & 1\\j & -j\end{bmatrix}$ |
| 9 | 2 layers: Precoding according to the latest PMI report on PUSCH, using the precoder(s) indicated by the reported PMI(s) |
| 10~15 | reserved |

TABLE 3

| Bit field mapped to index | Message |
|---|---|
| 0 | 4 layers: Transmit diversity |
| 1 | 1 layer: TPMI = 0 |
| 2 | 1 layer: TPMI = 1 |
| . | . |
| . | . |
| . | . |
| 16 | 1 layer: TPMI = 15 |
| 17 | 1 layer: Precoding according to the latest PMI report on PUSCH using the precoder(s) indicated by the reported PMI(s) |
| 18 | 2 layers: TPMI = 0 |
| 19 | 2 layers: TPMI = 1 |
| . | . |
| . | . |
| . | . |
| 33 | 2 layers: TPMI = 15 |
| 34 | 2 layers: Precoding according to the latest PMI report on PUSCH using the precoder(s) indicated by the reported PMI(s) |
| 35 | 3 layers: TPMI = 0 |
| 36 | 3 layers: TPMI = 1 |
| . | . |
| . | . |
| . | . |
| 50 | 3 layers: TPMI = 15 |
| 51 | 3 layers: Precoding according to the latest PMI report on PUSCH using the precoder(s) indicated by the reported PMI(s) |
| 52 | 4 layers: TPMI = 0 |
| 53 | 4 layers: TPMI = 1 |
| . | . |
| . | . |
| . | . |

TABLE 3-continued

| Bit field mapped to index | Message |
|---|---|
| 67 | 4 layers: TPMI = 15 |
| 68 | 4 layers: Precoding according to the latest PMI report on PUSCH using the precoder(s) indicated by the reported PMI(s) |
| 69~127 | reserved |

A similar approach may also be taken for the DCIs scheduling DL TM6 (DCI Format 7-1D) as well as for DL TM8 (DCI Format 7-1D), where there is a reserved value available also, as shown Table 4 below (corresponding to Table 5.3.3.1.21-1 of 3GPP TS 36.212 V15.0.1).

TABLE 4

| Number of layers and antenna port field value | Number of layers | Antenna port |
|---|---|---|
| 00 | 1 | 7 |
| 01 | 1 | 8 |
| 10 | 2 | 7, 8 |
| 11 | Reserved | Reserved |

In contrast, however, for DL TM9 and TM10, all the signalling states are already being used. Table 5 (corresponding to Table 5.3.3.1.22-1 of 3GPP TS 36.212 V15.0.1) shows the antenna port(s), scrambling identity and number of layers for TM9 (and TM10). As specified in Table 5, in which there are 3 bits where $n_{SCID}$ is the scrambling identity for antenna ports 7 and 8, or 1 bit as specified where $n_{SCID}$ is the scrambling identity for antenna ports 7 and 8 when higher layer parameter semiOpenLoop is configured. When higher layer parameter semiOpenLoop is configured, antenna ports 7 and 8 may be used for transmit diversity. Accordingly, a solution is needed to enable transmit diversity fallback for TM9 and TM10, using just the 3 bits/8 states available (i.e., without any additional bits).

TABLE 5

| Value | Message |
|---|---|
| 0 | 1 layer, port 7, $n_{SCID} = 0$ |
| 1 | 1 layer, port 7, $n_{SCID} = 1$ |
| 2 | 1 layer, port 8, $n_{SCID} = 0$ |
| 3 | 1 layer, port 8, $n_{SCID} = 1$ |
| 4 | 2 layers, ports 7-8, $n_{SCID} = 0$ |
| 5 | 2 layers, ports 7-8, $n_{SCID} = 1$ |
| 6 | 3 layers, ports 7-9 |
| 7 | 4 layers, ports 7-10 |

It is noted that transmit diversity for TM9 and TM10 can be higher layer configured by using the RRC parameter semiOpenLoop, where transmit diversity utilizes antenna port 7 and port 8 using the $n_{SCID}$ defined by the one bit signalling. However, in this case, only transmit diversity can be used but not scheduling higher order downlink (DL) multiple-input multiple-output (MIMO) or transmit diversity dynamically.

As mentioned above, one embodiment may enable dynamic fallback indicated in the scheduling DCI for DL TM9 (DCI Format 7-1F) and TM10 (DCI Format 7-1G) for shorter TTI, without increasing the DCI signalling overhead. In other words, an embodiment is configured to use just the 3 available bits Antenna port(s), scrambling identity and number of layers indication, to enable dynamic transmit diversity fallback.

According to some examples, a UE may have support for up to 2 DL MIMO layers or support for up to 4 DL MIMO layers for LTE shorter TTI (slot- or subslot) PDSCH. Certain embodiments may provide solutions for both of these scenarios.

For the case where the UE supports up to 2 DL MIMO layers, looking at Table 5 above the last two entries (i.e., 3 or 4 layer spatial multiplexing) will actually never be used in the DCI signalling, as the UE would only support PDSCH TM9 or TM10 reception with up to 2 MIMO layers anyhow. Thus, an embodiment defines an alternative table (Table 6) for the case where only up to 2 spatially multiplexed MIMO layers are supported for shorter TTI TM9 and/or TM10. As shown in Table 6 below, the two non-useable entries (3 & 4 layers MIMO) are replaced by a transmit diversity solution supported with semiOpenLoop TM9 and TM10 operation. In certain embodiments, this could be done by having a different table depending on the number of supported MIMO layers in the communication. For example, in the case of the UE supporting only up to 2 layers, the mapping table that is used can be Table 6.

TABLE 6

| Value | Message |
|---|---|
| 0 | 1 layer, port 7, $n_{SCID} = 0$ |
| 1 | 1 layer, port 7, $n_{SCID} = 1$ |
| 2 | 1 layer, port 8, $n_{SCID} = 0$ |
| 3 | 1 layer, port 8, $n_{SCID} = 1$ |
| 4 | 2 layers, ports 7-8, $n_{SCID} = 0$ |
| 5 | 2 layers, ports 7-8, $n_{SCID} = 1$ |
| 6 | ~~3 layers, ports 7-9~~ 2 layers, transmit diversity ports 7-8, $n_{SCID} = 0$ |
| 7 | ~~4 layers, ports 7-10~~ 2 layers, transmit diversity ports 7-8, $n_{SCID} = 1$ |

In some embodiments, at least for UEs supporting up to 2 spatially multiplexed layers or operation restricted to up to 2 MIMO layers, the dynamic transmit diversity fallback may be done without having any effect on the scheduling flexibility. Certain example embodiments provide different options on how to define when the up to 2 MIMO layers are used. These options may include UE indication based or eNB indication based.

For the UE indication based option, a UE may report its MIMO capability independently for shorter TTI. According to certain embodiments, in the case where the UE reports support for only up to 2 layer MIMO, Table 6 discussed above may be used instead of the table specified in the current 3GPP specifications. It is noted that Table 6 is just one example embodiment, which may be modified according to other example embodiments. As an example, in certain embodiments, the order of the rows or entries shown in Table 6 may be modified. For instance, the new entries related to transmit diversity may be placed on the lowest values, e.g., row with "value 0" and/or "value 1", etc., while the other "older" entries could be moved down. In other embodiments, the new transmit diversity entries may be moved up to any of the rows of the table.

For the eNB indication based option, in one embodiment, there may be provided RRC configuration on the maximum number of MIMO layers. For example, an embodiment may use the RRC signaling maxLayersMIMO or a similar new shorter TTI specific RRC signaling on the maximum number of layers used.

Another embodiment of the eNB indication option may be based on codebook subset restriction. The shorter TTI PDSCH operation supports a rather extensive flexibility in the codebook subset restriction for CSI reporting (restriction of the PMI/Rank combinations that the UE is allowed to indicate to the eNB). Therefore, in this embodiment, in case only codebooks for up to 2 layers are to be supported (which basically restricts the rank for CSI reporting), the support for only up to 2 layers and usage of Table 6 above may be assumed.

Another embodiment of the eNB indication option may be limited by the number of configured channel state information reference signal (CSI-RS) ports, which already now limits the rank in the CSI reporting. In this example, if only two CSI-RS ports are configured, then the UE may assume use of Table 6.

Another embodiment of the eNB indication option may include dedicated RRC configuration of using Table 6. This example having a dedicated configuration of the table to be applied, the table supporting up to 4 layer MIMO spatial multiplexing or Table 6 with up to 2 layers+transmit diversity fallback.

Furthermore, it should also be noted that additional transmit diversity solutions can be envisioned to be signalled according to example embodiments. These may include, for example, 4 layer transmit diversity with ports 7-10 or CRS-based TX diversity fallback, as shown in the examples of Table 7 and Table 8 shown below.

TABLE 7

| Value | Message |
|---|---|
| 0 | 1 layer, port 7, $n_{SCID} = 0$ |
| 1 | 1 layer, port 7, $n_{SCID} = 1$ |
| 2 | 1 layer, port 8, $n_{SCID} = 0$ |
| 3 | 1 layer, port 8, $n_{SCID} = 1$ |
| 4 | 2 layers, ports 7-8, $n_{SCID} = 0$ |
| 5 | 2 layers, ports 7-8, $n_{SCID} = 1$ |
| 6 | 2 layers, transmit diversity ports 7-8, $n_{SCID} = 0$ |
| 7 | 4 layers, transmit diversity ports 7-10 |

TABLE 8

| Value | Message |
|---|---|
| 0 | 1 layer, port 7, $n_{SCID} = 0$ |
| 1 | 1 layer, port 7, $n_{SCID} = 1$ |
| 2 | 1 layer, port 8, $n_{SCID} = 0$ |
| 3 | 1 layer, port 8, $n_{SCID} = 1$ |
| 4 | 2 layers, ports 7-8, $n_{SCID} = 0$ |
| 5 | 2 layers, ports 7-8, $n_{SCID} = 1$ |
| 6 | 2 layers, transmit diversity ports 7-8, $n_{SCID} = 0$ |
| 7 | Transmit diversity based on CRS |

For the case where the UE supports up to 4 DL MIMO layers, there is no space in the dynamic signaling as all the elements for up to 4 DL MIMO layers are already used. According to an embodiment, Table 9 shown below may be used as the mapping table.

TABLE 9

| Value | Message |
|---|---|
| 0 | 1 layer, port 7, $n_{SCID} = 0$ |
| 1 | 1 layer, port 7, $n_{SCID} = 1$ |
| 2 | 1 layer, port 8, $n_{SCID} = 0$ |

TABLE 9-continued

| Value | Message |
|---|---|
| 3 | 1 layer, port 8, $n_{SCID}$ = 1 |
| 4 | 2 layers, ports 7-8, $n_{SCID}$ = 0 |
| 5 | ~~2 layers, ports 7-8, $n_{SCID}$=1~~ |
|   | 2 layers, transmit diversity, ports 7-8, $n_{SCID}$ = 1 |
| 6 | 3 layers, ports 7-9 |
| 7 | 4 layers, ports 7-10 |

With the change provided in Table 9, the multi-user MIMO operation might slightly deviate for the UE with spatial multiplexing, but would still be enabled and supported by multi-user MIMO multiplexing of transmit diversity for one UE with up to 2 layer MIMO of other UE(s). Therefore, in one embodiment, the current mapping table may be changed as noted in Table 9 and only this table is supported for up to 4 layer MIMO. In another embodiment, the new Table 9 for up to 4 layers can be configured by dedicated RRC signaling, instead of the current table in the 3GPP specifications.

It is noted that Tables 7, 8, and 9 shown above illustrate some possible example embodiments, which may be modified according to other example embodiments. For example, in certain embodiments, the order of the rows or entries shown in Tables 7, 8, and/or 9 may be modified. For instance, the new entries related to transmit diversity may be placed on the lowest values, e.g., row with "value 0" and/or "value 1", etc., while the other "older" entries could be moved down. In other embodiments, the new transmit diversity entries may be moved up to any of the rows of the table.

In view of the above, in an embodiment from the perspective of the eNB in case of support for up to 2 layers, the eNB may optionally configure a UE with a maximum of 2 MIMO layers for TM9 and/or TM10 (if based on eNB configuration). According to certain embodiments, the configuration may be a dedicated configuration of maximum MIMO layers (in general or specifically for shorter TTI), may depend on number of CSI-RS ports (e.g., only two CSI RS ports are configured), and/or may be through codebook subset restriction (e.g., UE is configured not to report rank>2).

In an embodiment, the eNB may receive a report from the UE of the maximum number of MIMO layers supported. According to some embodiments, if the maximum number of supported layers is 2, then the eNB may use, or indicate the UE to use, Table 6 or Table 7 or Table 8 for TM9 and/or TM10 scheduling for up to 2 layers, thereby enabling dynamic fallback. According to some other embodiments, if the maximum number of supported layers is greater than 2, then the eNB may use, or indicate the UE to use, Table 9 for TM9 and/or TM10 scheduling for up to 4 layers (legacy, or modified table 9 as noted above).

In an embodiment from the perspective of the UE in case of support for up to 2 layers, the UE may be configured to report the maximum number of MIMO layers supported to an eNB based on UE capability signaling. Optionally, in one embodiment, the UE may receive eNB configuration of a maximum of 2 MIMO layers for TM9 and/or TM10 (if based on eNB configuration). For example, according to some embodiments, the configuration may be a dedicated configuration of maximum MIMO layers (in general or specifically for shorter TTI), may depend on number of CSI-RS ports (e.g., only two CSI RS ports are configured), and/or may be through codebook subset restriction (e.g., UE is configured not to report rank>2).

According to an embodiment, if the maximum number of layers is 2, then the UE may be configured to use Table 6 or Table 7 or Table 8 for TM9 and/or TM10 scheduling for up to 2 layers, thereby enabling dynamic fallback. In another embodiment, if the maximum number of supported layers is greater than 2, the UE may be configured to use Table 9 for TM9 and/or TM10 scheduling for up to 4 layers (legacy, or modified table 9 as noted above).

It should be noted that, while some embodiments discussed herein refer to nodes named eNB and UE, these are merely examples. The eNB may also be an access point, base station, node B, gNB, or any other network node capable of providing radio access functionality, and the UE may be a mobile device, stationary device, IoT device, or any other device capable of communication with a wireless or wired communication network.

For 4 MIMO layers, the original table from the 3GPP specifications may be used or the modified table (as noted in the Tx diversity support for up to 4 layers, e.g., according to Table 9) can be implemented on top of the selection depending on the number of supported MIMO layers. This may, for example, depend on RRC configuration of an alternative table (e.g., Table 9) for the up to 4 layer MIMO operation.

FIG. 1a illustrates an example flow diagram of a method for dynamic fallback to transmit diversity, according to one embodiment. For example, in an embodiment, the method may be for dynamic fallback to transmit diversity with shorter TTI PDSCH TM9 and TM10. In certain embodiments, the flow diagram of FIG. 1a may be performed by a network node, such as a base station, node B, eNB, gNB, or any other access node.

As illustrated in the example of FIG. 1a, the method may optionally include, at 100, receiving a report from a UE of the maximum number of MIMO layers supported for PDSCH (in general or specifically for shorter TTI). The method may then optionally include, at 110, configuring the UE with a maximum of 2 MIMO layers for TM9 and/or TM10 (if based on eNB configuration) or with the maximum number of MIMO layers reported by the UE. According to certain embodiments, the configuration may be a dedicated configuration of maximum MIMO layers (in general or specifically for shorter TTI), may depend on number of CSI-RS ports (e.g., only two CSI RS ports are configured), and/or may be through codebook subset restriction (e.g., UE is configured not to report rank>2).

In an embodiment, the method may also include, at 120, performing TM9 and/or TM10 scheduling. In some embodiments, if the maximum number of supported layers is 2, then the performing 120 may include using, or indicating to the UE to use, one of the modified tables providing transmit diversity fallback according to example embodiments, such as Table 6 or Table 7 or Table 8 for the TM9 and/or TM10 scheduling for up to 2 layers, thereby enabling dynamic fallback. According to some other embodiments, if the maximum number of supported layers is greater than 2, then the performing 120 may include using, or indicating to the UE to use, one of the modified tables providing transmit diversity fallback according to example embodiments, such as Table 9 for TM9 and/or TM10 scheduling for up to 4 layers (legacy, or modified table 9 as noted above).

For example, in some embodiments, the performing 120 may include determining if the maximum number of layers is 2. If it is determined that the maximum number of layers is 2, then the method may include using, or indicating to the UE to use, one of the tables providing transmit diversity fallback according to example embodiments, such as Table 6 or Table 7 or Table 8 for TM9 and/or TM10 scheduling for up to 2 layers, thereby enabling dynamic fallback. If it is determined that the maximum number of supported layers is not 2 (i.e., maximum number of layers is greater than 2), then the method may include using, or indicating to the UE to use, one of the tables providing transmit diversity fallback according to example embodiments, such as Table 9 for TM9 and/or TM10 scheduling for up to 4 layers (i.e., legacy tables, or modified Table 9 providing transmit diversity fallback as noted above).

Figure 1B:
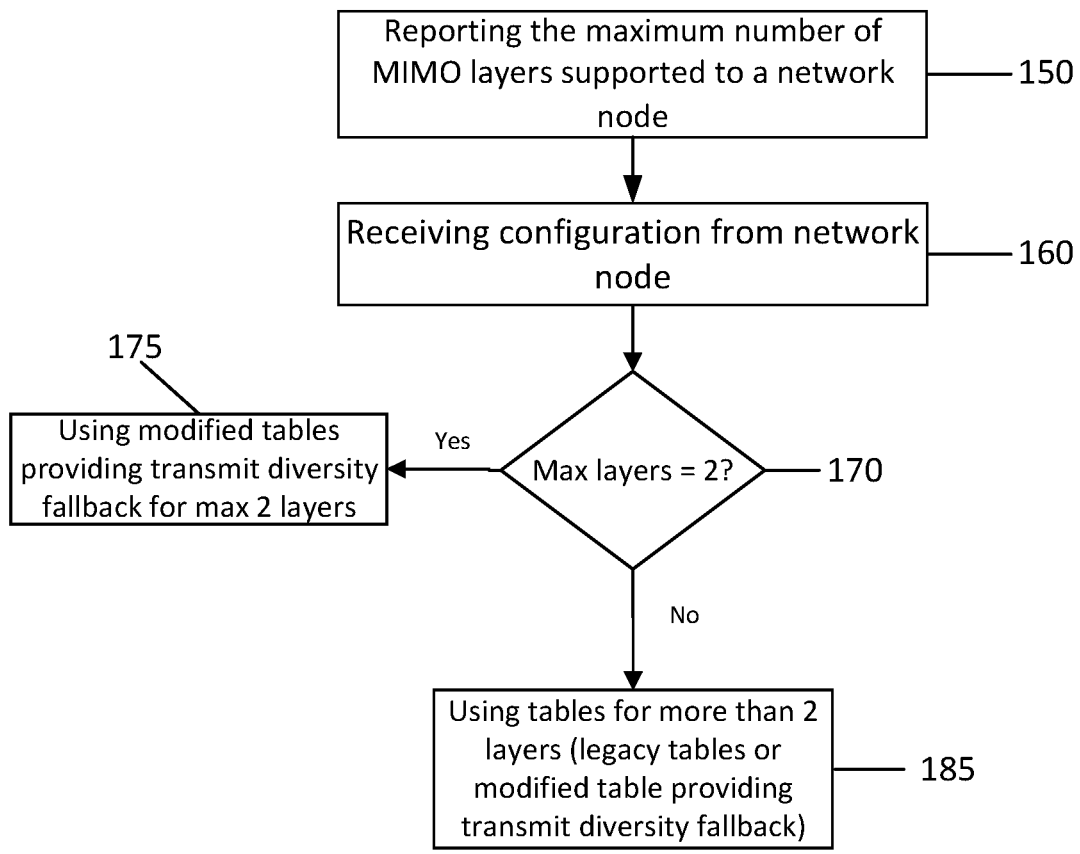
FIG. 1b illustrates an example flow diagram of a method, according to another embodiment.

FIG. 1b illustrates an example flow diagram of a method for dynamic fallback to transmit diversity, according to one embodiment. For example, in an embodiment, the method may be for dynamic fallback to transmit diversity with shorter TTI PDSCH TM9 and TM10. In certain embodiments, the flow diagram of FIG. 1b may be performed by a UE, mobile station, mobile equipment, IoT device, or the like.

As illustrated in the example of FIG. 1b, the method may include, at 150, reporting the maximum number of downlink shared channel MIMO layers (in general of specifically for shorter TTI) supported to a network node, for example, based on UE capability signaling. Optionally, in one embodiment, the method may include, at 160, receiving from the network node a configuration of a maximum of 2 MIMO layers for TM9 and/or TM10 (if based on network configuration). For example, according to some embodiments, the configuration may be a dedicated configuration of maximum MIMO layers (in general or specifically for shorter TTI), may depend on number of CSI-RS antenna ports (e.g., only two CSI RS antenna ports are configured), and/or may be through codebook subset restriction (e.g., UE is configured not to report precoding matrix indices corresponding to rank>2).

According to an embodiment, the method may include determining, at 170, if the maximum number of layers is 2. If it is determined that the maximum number of layers is 2, then the method may include, at 175, using one of the tables providing transmit diversity fallback according to example embodiments, such as Table 6 or Table 7 or Table 8 for TM9 and/or TM10 scheduling for up to 2 layers, thereby enabling dynamic fallback. If it is determined that the maximum number of supported layers is not 2 (i.e., maximum number of layers is greater than 2), then the method may include, at 185, using one of the tables for more than 2 MIMO layers, such as Table 5 for TM9 and/or TM10 scheduling for up to 4 layers (legacy), or modified Table 9 providing transmit diversity fallback according to example embodiments (i.e., legacy tables, or modified Table 9 providing transmit diversity fallback as noted above).

Figure 2A:
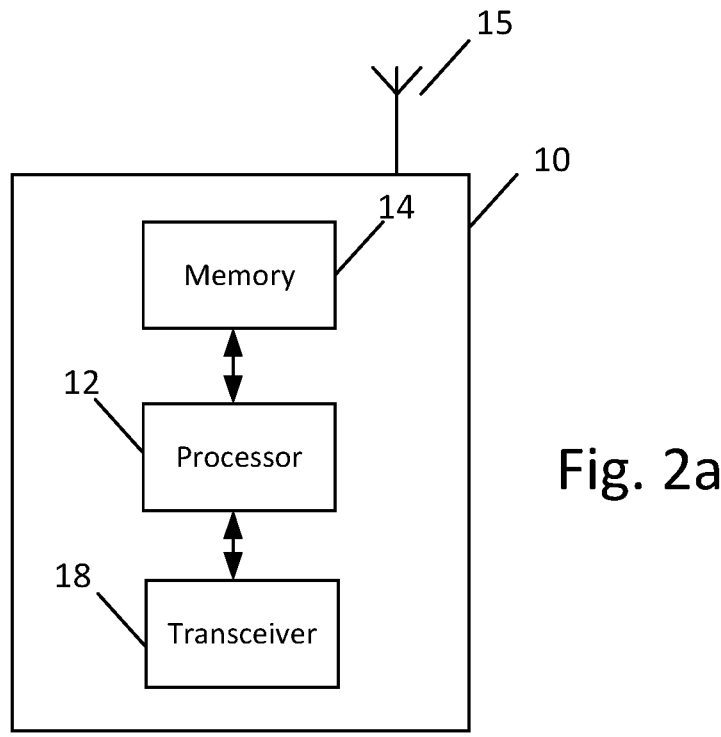
FIG. 2a illustrates an example block diagram of an apparatus, according to an embodiment.

FIG. 2a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 2a.

As illustrated in the example of FIG. 2a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 2a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow or signaling diagram illustrated in FIG. 1. For example, in certain embodiments, apparatus 10 may be controlled by memory 14 and processor 12 to perform one or more of the steps illustrated in FIG. 1a. In certain embodiments, apparatus 10 may be configured to perform a procedure for providing dynamic fallback to transmit diversity, for example, with shorter TTI PDSCH TM9 and/or TM10.

For instance, in one embodiment, apparatus 10 may be controlled by memory 14 and processor 12 to receive a report from a UE of the maximum number of MIMO layers supported. In an embodiment, apparatus 10 may optionally be controlled by memory 14 and processor 12 to configure the UE with a maximum of 2 MIMO layers for TM9 and/or TM10 (if based on eNB configuration) or with the maximum number of MIMO layers reported by the UE. According to certain embodiments, the configuration may be a dedicated configuration of maximum MIMO layers (in general or specifically for shorter TTI), may depend on number of CSI-RS ports (e.g., only two CSI RS ports are configured), and/or may be through codebook subset restriction (e.g., UE is configured not to report rank>2).

In an embodiment, apparatus 10 may be controlled by memory 14 and processor 12 to perform TM9 and/or TM10 scheduling. For example, in some embodiments, apparatus 10 may be controlled by memory 14 and processor 12 to determine if the maximum number of layers is 2. If it is determined that the maximum number of layers is 2, then apparatus 10 may be controlled by memory 14 and processor 12 to use, or indicate to the UE to use, one of the tables providing transmit diversity fallback according to example embodiments, such as Table 6 or Table 7 or Table 8 for TM9 and/or TM10 scheduling for up to 2 layers, thereby enabling dynamic fallback. If it is determined that the maximum number of supported layers is not 2 (i.e., maximum number of layers is greater than 2), then apparatus 10 may be controlled by memory 14 and processor 12 to use, or indicate to the UE to use, one of the tables for more than 2 MIMO layers, such as Table 5 for TM9 and/or TM10 scheduling for up to 4 layers (legacy) or modified Table 9 providing transmit diversity fallback according to example embodiments (i.e., legacy tables, or modified Table 9 providing transmit diversity fallback as noted above).

Figure 2B:
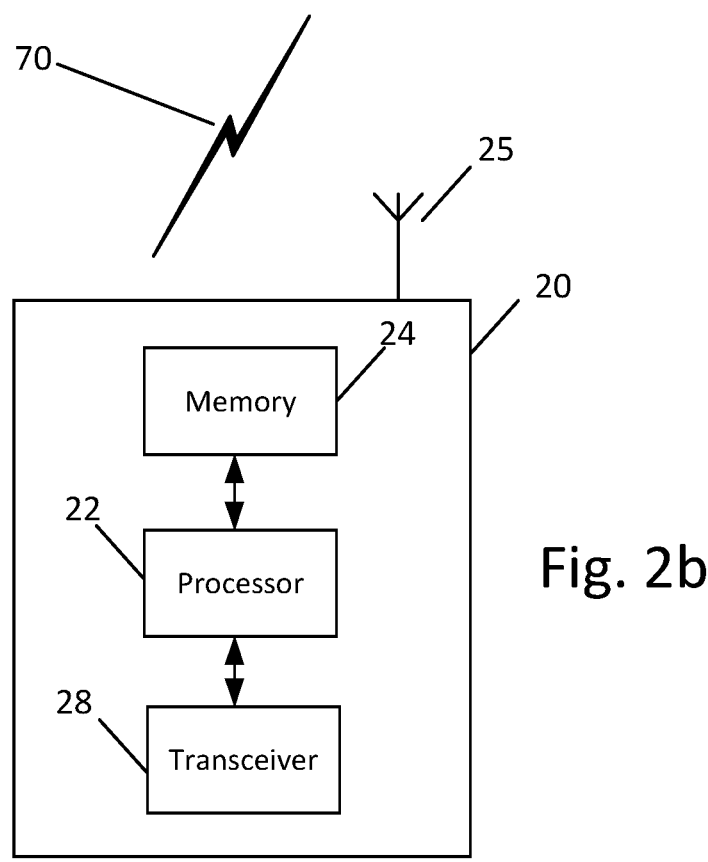
FIG. 2b illustrates an example block diagram of an apparatus, according to another embodiment.

FIG. 2b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 2b.

As illustrated in the example of FIG. 2b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 2b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the flow diagrams illustrated in FIG. 1b.

According to some embodiments, apparatus 20 may be controlled by memory 24 and processor 22 to report the maximum number of MIMO layers supported by apparatus 20 to a network node, for example, based on UE capability signaling. The maximum number of MIMO layers may be generically applicable or specifically for shorter TTI operation. Optionally, in one embodiment, apparatus 20 may be controlled by memory 24 and processor 22 to receive from the network node a configuration of a maximum of 2 MIMO layers for TM9 and/or TM10 (if based on network configuration). For example, according to some embodiments, the configuration may be a dedicated configuration of maximum MIMO layers (in general or specifically for shorter TTI), may depend on number of CSI-RS ports (e.g., only two CSI RS ports are configured), and/or may be through codebook subset restriction (in general or specifically for shorter TTI, e.g., UE is configured not to report rank>2).

According to an embodiment, apparatus 20 may be controlled by memory 24 and processor 22 to determine if the maximum number of layers is 2. If it is determined that the maximum number of layers is 2, then apparatus 20 may be controlled by memory 24 and processor 22 to use one of the tables providing transmit diversity fallback according to example embodiments, such as Table 6 or Table 7 or Table 8 for TM9 and/or TM10 scheduling for up to 2 layers, thereby enabling dynamic fallback. If it is determined that the maximum number of layers is not equal to 2 (i.e., more than 2 MIMO layers are supported), then apparatus 20 may be controlled by memory 24 and processor 22 to use one of the tables for more than 2 MIMO layers, such as Table 5 for TM9 and/or TM10 scheduling for up to 4 layers (legacy), or modified table 9 providing transmit diversity fallback (as noted above).

Therefore, certain example embodiments provide several technical improvements, enhancements, and/or advantages. Various example embodiments may provide support for dynamic transmit diversity fallback for TM9/TM10. For up to 2 layer MIMO support, example embodiments enable dynamic diversity fallback without any additional drawbacks (as only non-useable entries in mapping tables are utilized). As such, example embodiments can improve performance, latency, and/or throughput of networks and network nodes including, for example, access points, base stations/eNBs/gNBs, and mobile devices or UEs. Accordingly, the use of certain example embodiments result in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

We claim:

1. An apparatus, comprising:
   at least one processor; and
   at least one memory comprising computer program code,
   the at least one memory and computer program code configured, with the at least one processor, to cause the apparatus at least to
   configure a user equipment with a maximum number of multiple-input multiple-output layers used for transmission mode 9 or transmission mode 10 scheduling;
   perform at least one of transmission mode 9 or transmission mode 10 scheduling,
   wherein the configuring comprises indicating to the user equipment to use a modified mapping table providing transmit diversity fallback for the at least one of transmission mode 9 or transmission mode 10 scheduling,
   wherein, when a maximum number of multiple-input multiple-output layers supported for a physical downlink shared channel is 2, the at least one memory and computer program code are configured, with the at least one processor, to cause the apparatus at least to indicate to the user equipment to use at least one modified mapping table providing transmit diversity fallback for the at least one of transmission mode 9 or transmission mode 10 scheduling for up to 2 layers, and
   wherein, when a maximum number of multiple-input multiple-output layers supported for the physical downlink shared channel is greater than 2, the at least one memory and computer program code are configured, with the at least one processor, to cause the apparatus at least to indicate to the user equipment to use at least one modified mapping table providing transmit diversity fallback for the at least one of transmission mode 9 or transmission mode 10 scheduling for up to 4 layers.

2. The apparatus according to claim 1, wherein, when the maximum number of multiple-input multiple-output layers supported for the physical downlink shared channel is 2, the at least one modified mapping table differs from a non-modified table by replacing at least entries in the non-modified table for 3-layer and 4-layer transmission with 2-layer transmission diversity fallback entries.

3. The apparatus according to claim 1, wherein, when the maximum number of multiple-input multiple-output layers supported for the physical downlink shared channel is greater than 2, the at least one modified mapping table differs from a non-modified table by replacing at least one entry in the non-modified table for 2-layer spatial multiplexing transmission with a 2-layer transmission diversity fallback entry.

4. The apparatus according to claim 1, wherein the at least one memory and computer program code are configured, with the at least one processor, to cause the apparatus at least to receive a report from the user equipment of the maximum number of multiple-input multiple-output layers supported for the physical downlink shared channel.

5. The apparatus according to claim 1, wherein the configuring comprises a dedicated configuration of maximum multiple-input multiple-output layers, or wherein the configuring depends on number of channel station information reference signal ports, or the configuring is performed through codebook subset restriction.

6. A method, comprising:
receiving, from a network node, a configuration of a maximum number of multiple-input multiple-output layers used for transmission mode 9 or transmission mode 10 scheduling;
using, based on the received configuration, a modified mapping table providing transmit diversity fallback for at least one of transmission mode 9 or transmission mode 10 downlink shared channel reception,
wherein, when a maximum number of multiple-input multiple-output layers supported for a physical downlink shared channel is 2, the using further comprises using at least one modified mapping table providing transmit diversity fallback for the at least one of transmission mode 9 or transmission mode 10 scheduling for up to 2 layers, and
wherein, when a maximum number of multiple-input multiple-output layers supported for the physical downlink shared channel is greater than 2, the using further comprises using at least one modified mapping table providing transmit diversity fallback for the at least one of transmission mode 9 or transmission mode 10 scheduling for up to 4 layers.

7. The method according to claim 6, wherein, when the maximum number of multiple-input multiple-output layers supported for the physical downlink shared channel is 2, the at least one modified mapping table differs from a non-modified table by replacing at least the entries in the non-modified mapping table for 3-layer and 4-layer transmission with 2-layer transmission diversity fallback entries.

8. The method according to claim 6, wherein, when the maximum number of multiple-input multiple-output layers supported for the physical downlink shared channel is greater than 2, the at least one modified mapping table differs from a non-modified table by replacing at least the entries in the non-modified table for 3-layer and 4-layer transmission with 2-layer transmission diversity fallback entries.

9. The method according to claim 6, further comprising reporting, to a network node, a maximum number of downlink shared channel multiple-input multiple-output layers that are supported.

10. The method according to claim 6, wherein the configuration comprises a dedicated configuration of maximum multiple-input multiple-output (MIMO) layers, or wherein the configuration depends on number of channel station information reference signal ports, or the configuration is performed through codebook subset restriction.

11. An apparatus, comprising:
at least one processor; and
at least one memory comprising computer program code, the at least one memory and computer program code configured, with the at least one processor, to cause the apparatus at least to
receive, from a network node, a configuration of a maximum number of multiple-input multiple-output layers used for transmission mode 9 or transmission mode 10 scheduling;
use, based on the received configuration, a modified mapping table providing transmit diversity fallback for at least one of transmission mode 9 or transmission mode 10 downlink shared channel reception,
wherein, when a maximum number of multiple-input multiple-output layers supported for a physical downlink shared channel is 2, the at least one memory and computer program code are configured, with the at least one processor, to cause the apparatus at least to use at least one modified mapping table providing transmit diversity fallback for the at least one of transmission mode 9 or transmission mode 10 scheduling for up to 2 layers, and
wherein, when a maximum number of multiple-input multiple-output layers supported for the physical downlink shared channel is greater than 2, the at least one memory and computer program code are configured, with the at least one processor, to cause the apparatus at least to use at least one modified mapping table providing transmit diversity fallback for the at least one of transmission mode 9 or transmission mode 10 scheduling for up to 4 layers.

12. The apparatus according to claim 11, wherein, when the maximum number of multiple-input multiple-output layers supported for the physical downlink shared channel is 2, the at least one modified mapping table differs from a non-modified table by replacing at least the entries in the non-modified mapping table for 3-layer and 4-layer transmission with 2-layer transmission diversity fallback entries.

13. The apparatus according to claim 11, wherein, when the maximum number of multiple-input multiple-output layers supported for the physical downlink shared channel is greater than 2, the at least one modified mapping table differs from a non-modified table by replacing at least the entries in the non-modified table for 3-layer and 4-layer transmission with 2-layer transmission diversity fallback entries.

14. The apparatus according to claim 11, wherein the at least one memory and computer program code are configured, with the at least one processor, to cause the apparatus at least to report, to a network node, a maximum number of downlink shared channel multiple-input multiple-output layers that are supported.

15. The apparatus according to claim 11, wherein the configuration comprises a dedicated configuration of maximum multiple-input multiple-output layers, or wherein the configuration depends on number of channel station information reference signal ports, or the configuration is performed through codebook subset restriction.

16. A non-transitory computer readable medium comprising program instructions which, when executed by a processor, cause the processor to perform at least the method according to claim 6.

* * * * *